United States Patent

Mitsumoto

(10) Patent No.: US 8,130,147 B2
(45) Date of Patent: Mar. 6, 2012

(54) SIGNAL WAVE ARRIVAL ANGLE MEASURING DEVICE

(75) Inventor: Masashi Mitsumoto, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 414 days.

(21) Appl. No.: 12/422,036

(22) Filed: Apr. 10, 2009

(65) Prior Publication Data

US 2010/0090900 A1     Apr. 15, 2010

(30) Foreign Application Priority Data

Oct. 15, 2008 (JP) ................. 2008-266274

(51) Int. Cl.
G01S 5/02 (2010.01)
G01S 13/00 (2006.01)
H01Q 3/00 (2006.01)

(52) U.S. Cl. ......... 342/417; 342/147; 342/377; 367/124

(58) Field of Classification Search ............... 342/417, 342/147–148, 368–384; 367/124–130
See application file for complete search history.

(56) References Cited

U.S. PATENT DOCUMENTS

| | | | |
|---|---|---|---|
| 6,525,685 B1 * | 2/2003 | Rose ........................ | 342/148 |
| 7,486,230 B2 * | 2/2009 | Takano et al. ............ | 342/147 |
| 2003/0100343 A1 * | 5/2003 | Zourntos et al. .......... | 455/562 |

FOREIGN PATENT DOCUMENTS

| | | |
|---|---|---|
| JP | 2000-121716 A | 4/2000 |
| JP | 2002-221561 A | 8/2002 |
| JP | 2006-047282 A | 2/2006 |

OTHER PUBLICATIONS

Richard Roy, et al., "ESPRIT—Estimation of Signal Parameters Via Rotational Invariance Techniques", IEEE Transactions on Acoustics. Speech. and Signal Processing. Jul. 1989, pp. 984-995, vol. 37, No. 7.
Nobuyoshi Kikuma: "Adaptive Antenna Techniques", OHM (Oct. 2003).
Notification of Reasons of Refusal (1st Office Action) from corresponding Japanese Patent Application No. 2008-266274, issued Sep. 9, 2010 with English Translation.

(Continued)

*Primary Examiner* — Thomas Tarcza
*Assistant Examiner* — Fred H Mull
(74) *Attorney, Agent, or Firm* — Sughrue Mion, PLLC

(57) ABSTRACT

A signal wave arrival angle measuring device includes: an observation data vector generation section generating an observation data vector necessary for an angle measurement of a signal wave from an electrical signal having been converted at a sensor group converting the signal wave of an observation target to the electrical signal; an ESPRIT angle measurement processing section calculating an arrival angle of the signal wave from the generated observation data vector; an arriving signal wave estimation section estimating information other than the arrival angle of the arriving signal wave from an angle measurement processing process data of the ESPRIT angle measurement processing at the ESPRIT angle measurement processing section; and a reliability determination section determining whether or not an angle measurement result of the calculated arrival angle is correct based on an estimation result of the arriving signal wave estimation section, and excluding an erroneous angle measurement result.

3 Claims, 4 Drawing Sheets

OTHER PUBLICATIONS

Okamura, Atsushi et al., "An ESPIRT direction Finding Algorithm Calibrating the Differences between Sub-Arrays," The Institute of Electronics, Information and Communication Engineers, Technical Report of the IEICE, A P. Antenna Propagation, Jan. 21, 1999, vol. 98, No. 539, pp. 81-88.

Okamura, Atsushi et al., "A compensation Method for the Differences between Sub-Array Responses in ESPRIT Algorithm," Information and Technology R & D Center, Mitsubishi Electric Corporation, Journal B of the Institute of Electronics, Information and Communications Engineers, Apr. 25, 1999, vol. J83-B, No. 4, pp. 501-509.

* cited by examiner

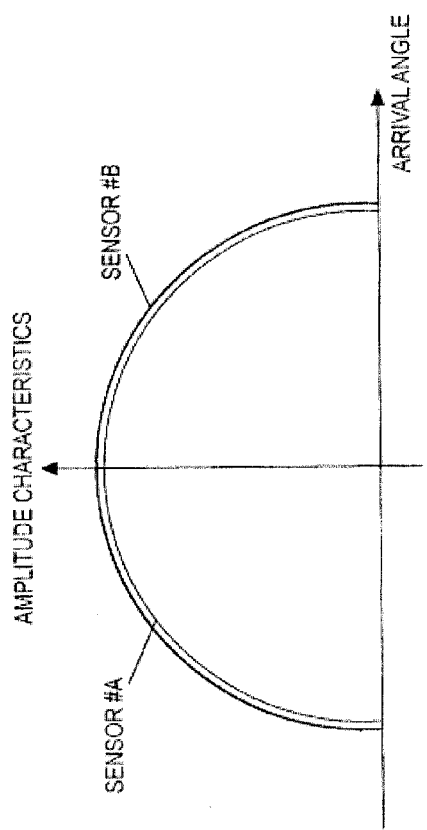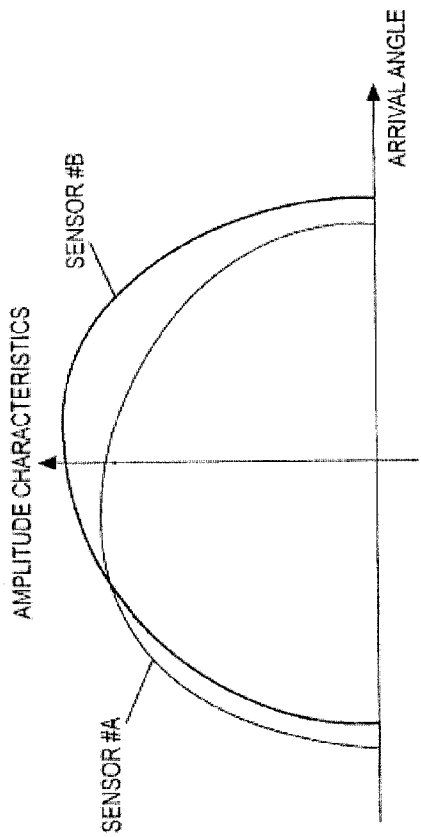

SIGNAL WAVE ARRIVAL ANGLE MEASURING DEVICE

BACKGROUND OF THE INVENTION

1. Field of the Invention

The present invention relates to a signal wave arrival angle measuring device for measuring an arrival angle (it may be hereinafter referred to as angle measurement) of a signal wave that is an observation target.

2. Description of the Related Art

In cases where there are a plurality of sensors disposed in spatially different positions (for example, in the case that a signal wave is a radio wave, those sensors are antennas) with respect to an arriving signal wave, an arrival angle of a signal wave can be measured.

In particular, when a data received at each sensor is subject to ESPRIT (Estimation of Signal Parameters via Rotation Invariance Techniques) angle measurement processing, an arrival angle of the signal wave can be measured with a comparatively small operation load achieving a high resolution.

Incidentally, the ESPRIT angle measurement processing is described in detail in the later-described R. Roy and t. Kailath: "ESPRIT—Estimation of Signal Parameters via Rotational Invariance Techniques," IEEE Trans., vol.ASSP-37, pp 984-995 (July 1989) (hereinafter referred to as Document 1); or Nobuyoshi Kikuma: "Adaptive Antenna Techniques" OHM (October 2003) (hereinafter referred to as Document 2), so that further descriptions are omitted.

In the conventional techniques, there remain the following problems to be solved.

In the ESPRIT angle measurement processing disclosed in the above non-Patent Documents 1 and 2, as is illustrated in FIG. 4A, an ideal condition (or a condition close to the ideal condition) is an assumption, and in which at all sensors employed (for example, sensor #A and sensor #B), reception characteristics of amplitude or phase with respect to the arrival angle of a signal wave are equal.

However, as illustrated in FIG. 4B, it is actually usual that any difference exists in reception characteristics of the amplitude or phase of each sensor (sensor #A and sensor #B) with respect to the arrival angle of a signal wave.

Due to such difference in characteristic, a received data comes to be out of the ideal condition, and angle measurement processing results are adversely affected.

In the ESPRIT angle measurement processing, the number of arriving signal waves is estimated (details are later-described), and thereafter next processing depending on that number is made to calculate and obtain angle measurement results.

However, when any reception characteristic difference exists in the amplitude or phase of each sensor with respect to the arrival angle of a signal wave, since the received data differs from that in the ideal condition, it is sometime the case that the number of arriving signal waves are erred in the estimation.

Thus, a problem exists in the occurrence of errors in angle measurement results calculated depending on the number of signal waves.

SUMMARY OF THE INVENTION

The present invention was made to solve the above-discussed problems, and has an object of obtaining a signal wave arrival angle measuring device in which with respect to an arriving signal wave, another information (for example, information such as an array response vector or an electric power) is further estimated other than arrival angle information, and whether or not angle measurement results are correct is determined based on this estimated another information, thereby enabling to exclude erroneous angle measurement results.

A signal wave arrival angle measuring device according to the present invention includes:

a sensor group converting a signal wave of an observation target to an electrical signal;

an observation data vector generation section generating an observation data vector necessary for an angle measurement of the mentioned signal wave from the electrical signal converted at the mentioned sensor group;

an ESPRIT angle measurement processing section calculating an arrival angle of the mentioned signal wave through an ESPRIT angle measurement processing from the observation data vector generated by the mentioned observation data vector generation section;

an arriving signal wave estimation section estimating information other than the arrival angle of the mentioned arriving signal wave from an angle measurement processing process data of the ESPRIT angle measurement processing at the mentioned ESPRIT angle measurement processing section; and a reliability determination section in which based on an estimation result of the mentioned arriving signal wave estimation section, it is determined whether or not an angle measurement result of the mentioned arrival angle calculated by the mentioned ESPRIT angle measurement processing section is correct, to exclude an erroneous angle measurement result.

According to the signal wave arrival angle measuring device of the invention, since another information (another information other than the arrival angle information) of an arriving signal wave is estimated in addition to arrival angle information of the arriving signal wave and it is determined whether or not angle measurement results are correct based on this another estimated information, erroneous angle measurement results can be excluded.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 4A and 4B are explanatory diagrams showing amplitude characteristics of a plurality of general sensors.

DETAILED DESCRIPTION OF THE INVENTION

Figure 1:
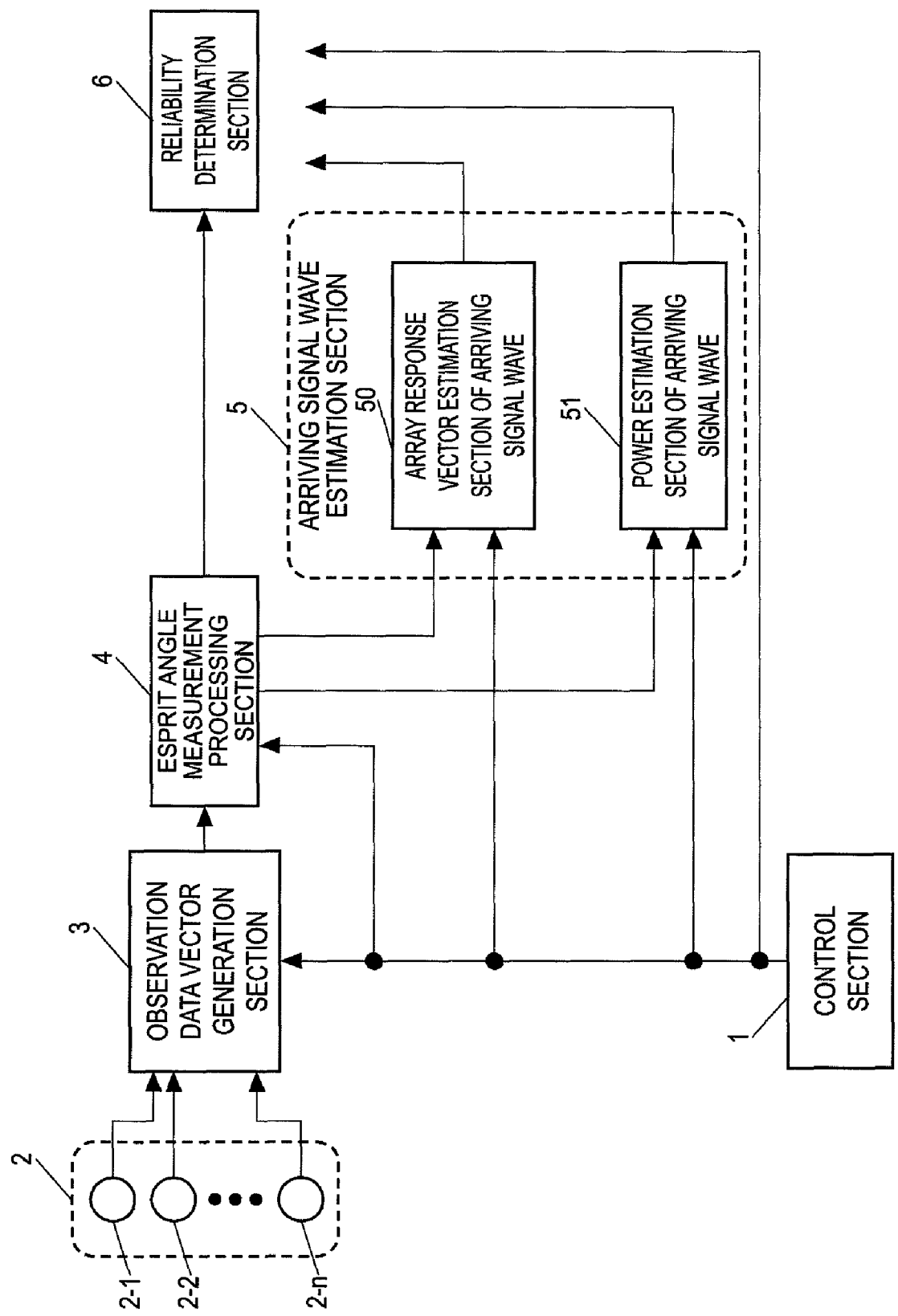
FIG. 1 is a block diagram illustrating arrangement of an angle measuring device according to a first embodiment of the present invention.

With reference to the drawings, an embodiment of the present invention is hereinafter described.

In the drawings, the same reference numerals designate the same or like parts.

Embodiment 1

FIG. 1 is a block diagram illustrating an arrangement of an angle measuring device according to a first embodiment.

With reference to FIG. 1, numeral 1 designates a control section, numeral 2 designates a sensor group, numeral 3 designates an observation data vector generation section, numeral 4 designates an ESPRIT angle measurement processing section, numeral 5 designates an arriving signal wave estimation section, numeral 50 designates an array response vector estimation section of an arriving signal wave, numeral 51 designates a power estimation section of an arriving signal wave, and numeral 6 designates a reliability determination section.

The control section 1 is formed of, for example, a dedicated logic circuit or a program in a general purpose DSP (Digital Signal Processor) or CPU (Central processing Unit), and controls an operation timing of each component.

In this embodiment, "each component" includes the observation data vector generation section 3 (the later-described transmission signal generation section 30, transfer switch 33, A/D converter 37, frequency analysis section 38, and target spectrum extraction section of the observation data vector generation section 3), the ESPRIT angle measurement processing section 4, the array response vector estimation section 50 of an arriving signal wave, the power estimation section 51 of the arriving signal wave, and the reliability determination section 6.

The sensor group 2 is formed of a plurality of sensors (2-1, 2-2, ... 2-n) corresponding to signal waves of an observation target (not illustrated) disposed in spatially different positions and converts the signal waves arriving as plane waves to electrical signals.

For example, in the case that a signal wave is a radio wave, the sensor will be an antenna.

This antenna is selected to be a suitable one from types of a horn, a waveguide slot, a patch (micro strip), and the like in respect of size or cost.

Incidentally, although the spatial position of each of the sensors (antennas) is arbitrary, it is supposed herein that respective sensors are to be disposed at regular intervals on the same straight line.

The signal wave having been converted to an electrical signal at each sensor of the sensor group 2 is inputted to the observation data vector generation section 3.

Figure 2:
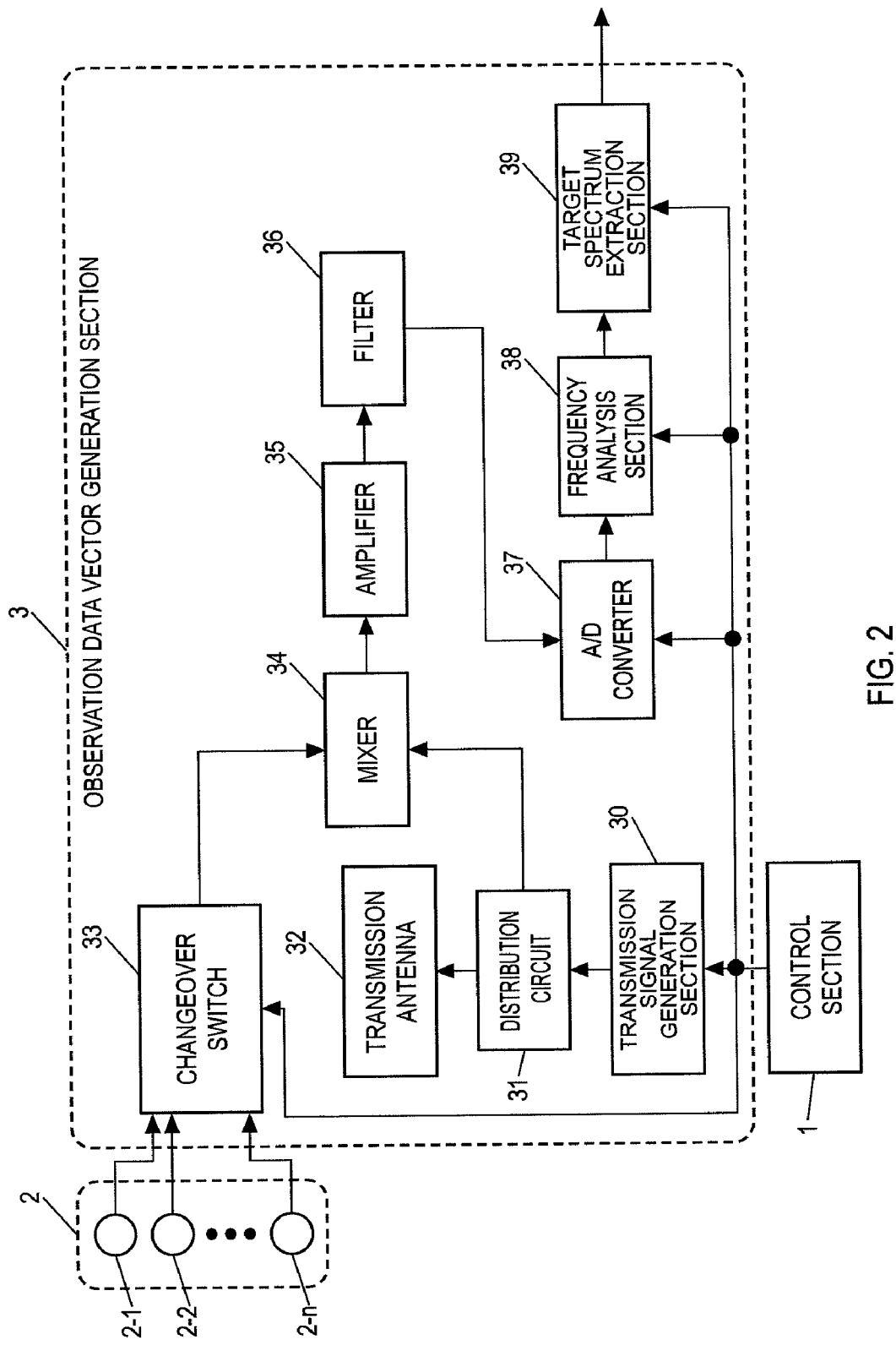
FIG. 2 is a diagram illustrating an arrangement example of an observation data vector generation section in the angle measuring device according to the first embodiment.

For example, in the case of using a radar of FMCW (Frequency Modulated Continuous Wave) type, as illustrated in FIG. 2, the observation data vector generation section 3 is formed of the transmission signal generation section 30, a distribution circuit 31, a transmission antenna 32, the transfer switch 33, a mixer 34, an amplifier 35, a filter 36, the A/D (Analog to Digital) converter 37, the frequency analysis section 38, the target spectrum extraction section 39, and the like.

The transmission signal generation section 30 generates a necessary transmission signal by the control of the control section 1. The distribution circuit 31 distributes and outputs the transmission signal generated by the transmission signal generation section 30 to the transmission antenna 32 and the mixer 34. The transmitted radio wave having been radiated from the transmission antenna 32 irradiates a target (not illustrated), and a part thereof comes into the sensor group 2.

As described above, the sensor group 2 converts the arriving radio waves to electrical signals and outputs them.

The transfer switch 33 is connected to all sensors of the sensor group 2, switched in sequence by the control section 1, and sequentially outputs electrical signals from all the sensors.

Incidentally, it is preferable that the transfer switch is not provided, but the same number of the mixers 34, the amplifiers 35, the filters 36, and the A/D converters 37 as the number of the sensors are provided.

That is, in the case that the sensor group 2 includes n (n=indefinite number) pieces of sensors, it is preferable that n mixers 34, amplifiers 35, filters 34 and A/D converters 37 are provided each corresponding to the n pieces of sensors.

The mixer 34 outputs a beat signal obtained by mixing the transmission signal and the arriving signal wave.

In the radar of FMCW type, the frequency of beat signal is varied depending on the distance to a target and the relative speed.

The beat signal to be outputted from the mixer 34 is amplified by the amplifier 35, only the required frequency being filtered at the filter 36, and the resulting signal is converted to a digital signal by the control of the control section 1 at the A/D converter 37.

The frequency analysis section 38 is inputted with the beat signal (the beat signal having been converted to the digital signal at the A/D converter 37) under the control of the control section 1, and outputs a frequency spectrum thereof (complex number).

The target spectrum extraction section 39, for example, based on a power waveform of the frequency spectrum to be outputted from the frequency analysis section 38, extracts a spectrum (complex number) of the frequency of which electric power is the maximum as a target spectrum.

This target spectrum obtained with respect to each sensor of the sensor group 2 is used as an observation data vector.

Incidentally, it is preferable that all portions of the frequency analysis section 38 and the target spectrum extraction section 39 are formed of a dedicated logic circuit, or a program in a general-purpose DSP or CPU. It is also preferable that a part of those sections is formed of a dedicated logic circuit, and the remaining parts are formed of a program in a general-purpose DSP or CPU.

The ESPRIT angle measurement processing section 4 is inputted with an observation data vector, and outputs angle measurement results in the following steps.

Additionally, as to variables, a vector is hereinafter indicated in { }, and a matrix is indicated in [ ].

First, as to an observation data vector $\{X(t)\}$ having been obtained from K pieces of sensors, a correlation matrix [Rxx] is obtained from the following expression (1).

At this time, for example, "a plurality of M (M=indefinite number) observation data vectors $\{X(t)n\}(n=1$ to $M)$" of which observation times are different is obtained, and all correlation matrixes that are obtained from respective observation data vectors are added (complex addition is made)

$$[Rxx] = \sum_{n=1}^{M} \{X(t)n\}(hrm\{X(t)n\}) \qquad (1)$$

where: hrm $\{X(t)n\}$ expresses a conjugate transpose of $\{X(t)n\}$.

Furthermore, it is preferable that the correlation matrix [Rxx] is transformed by the so-called Spatial Smoothing Preprocessing or Forward/Backward Spatial Smoothing Preprocessing.

With respect to the correlation matrix [Rxx] having been obtained, the so-called eigenvalue problem is solved, and an eigenvector corresponding to the eigenvalue is obtained.

That is, letting $[\Gamma]$: a diagonal matrix of which diagonal element is an eigenvalue $\gamma i$ (i=1 to K), and letting [E]: a matrix of which element in a column direction is an eigenvector,

[E] and $[\Gamma]$ holding the relationship of $$[Rxx][E]=[E][\Gamma] \qquad (2)$$

are calculated.

Incidentally, there is a plurality of solutions of the eigenvalue problem as is generally known, so that a solution is to be selected, taking operation load, reliability or the like as an indicator.

Numeric comparison or reference of respective eigenvalues K having been calculated are made, and the number γi (i=1 to K) of signal waves arriving to the sensor group 2 is estimated.

For example, it is preferable that the minimum eigenvalue is multiplied by a coefficient having preliminarily been set to let this obtained value a threshold, and the number of eigenvalues larger than this value is estimated to be an arriving signal wave number. It is also preferable that making comparison with a threshold having preliminarily been set independently of an eigenvalue, the number of eigenvalues larger than this value is estimated to be an arriving signal wave number.

An arriving signal wave number is hereinafter supposed to be L.

Next, eigenvectors of the same number as the arriving signal wave number are extracted in decreasing order of corresponding eigenvalue, to obtain a signal subspace [Es] (K lines and L columns).

From the signal subspace [Es], on the basis of the principle of ESPRIT angle measurement processing, two matrixes [E1s] and [E2s] are generated.

More specifically,

[E1s] is a matrix extracted from the 1st line to the K−1th line of [Es], and

[E2s] is a matrix extracted from the 2nd line to the Kth line of [Es].

The least squares problem that is expressed by the following expression regarding the above-mentioned two matrixes [E1s] and [E2s] is solved by LS (Least Squares) or TLS (Total Least Squares), and a solution [ψ] is obtained.

$$[E1s][\psi]=[E2s] \quad (3)$$

Then, as to the solution [ψ] of the least squares problem, the so-called eigenvalue problem is solved, and eigenvectors each corresponding to the eigenvalues are obtained.

That is, letting [Φ]: a diagonal matrix of which diagonal element is an eigenvalue $\phi j$ (j=1~K) and letting inv[T]: a matrix of which column directional element is an eigenvector, inv[T] and [Φ] holding the relationship of $$[\psi](inv[T])=(inv[T])[\Phi] \quad (4)$$

are calculated.

where: inv[T] express an inverse matrix of [T].

At this time, the number of the eigenvalues is the same as the arriving signal wave number, and each eigenvalue corresponds to each arriving signal wave on one-to-one basis.

From each eigenvalue $\phi j$ (j=1~K), the angle of each arriving signal wave is obtained.

In general, the eigenvalue $\phi j$ is a complex number. Supposing that an argument (phase) amount of this complex number is $\zeta j$, an arrival angle $\theta j$ can be obtained from the following expression.

$$\theta j = \sin^{-1}((\lambda \zeta j)/(2\pi d)) \quad (5)$$

The arriving signal wave estimation section 5 is inputted with data to be obtained in angle measurement processing process from the ESPRIT angle measurement processing section 4 to estimate information other than the arrival angle of the arriving signal wave.

Incidentally, the "information other than an arrival angle" is to be, for example, information of the later-described array response vector or electric power.

The array response vector estimation section 50 [Es] and of an arriving signal wave is inputted with a signal subspace an eigenvector inv[T] of the solution of the least squares problem from the ESPRIT angle measurement processing section 4, and obtains an array response vector [A] corresponding to each arriving signal wave.

$$[A]=[Es](inv[T]) \quad (6)$$

The power estimation section 51 of an arriving signal wave is inputted with [Γs], being L numbers (the same number as the arriving signal wave number) of larger eigenvalues [Γ] of the the correlation matrix [Rxx], and the eigenvector inv[T] of the solution [ψ] of the least squares problem, and estimates an electric power corresponding to each arriving signal wave.

Letting [P]: a diagonal matrix of which diagonal element is an electric power py (y=1~K) of each of the arriving signal waves, and assuming that the influence of noise is extremely small, the following calculation is made:

$$[P]=[T][\Gamma s](hrm\ [T]) \quad (7)$$

where: hrm [T] expresses a conjugate transpose matrix of [T].

The reliability determination section 6 is inputted with the angle, array response vector and electric power corresponding to each arriving signal wave.

Figure 3A:
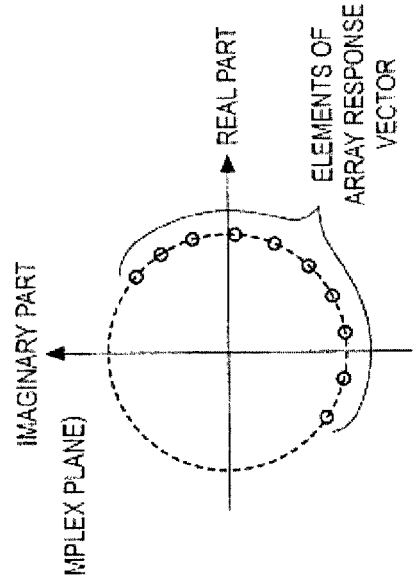
FIGS. 3A through 3D are explanatory diagrams showing an array response vector in the first embodiment.

In this respect, respective vector elements (indicated by hollow circles in the drawing) of the array response vector of which vector element number is the same as the number of pieces of the sensors of the sensor group 2 are theoretically positioned on the same circle in a complex plane as shown in FIG. 3A.

However, in the case that, due to influence of a characteristic difference in amplitude or phase with respect to an arrival angle at each sensor, large errors are superimposed on eigenvalues of the correlation matrix and an arriving signal wave number is erred, then the ESPRIT angle measurement processing will be made in the condition different from the actual arriving_signal wave number.

Figure 3B:
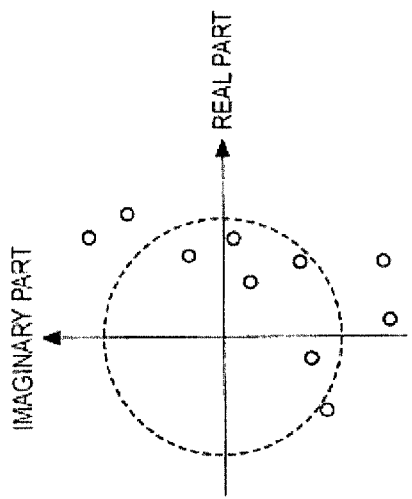

In such case, the array response vector of the arriving signal wave to be obtained from processing results cannot be obtained properly, and as shown in FIG. 3B, the vector elements are not positioned on the same circle in the complex plane.

Figure 3C:
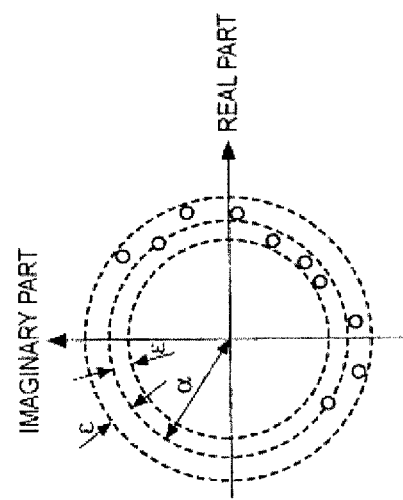
Figure 3D:
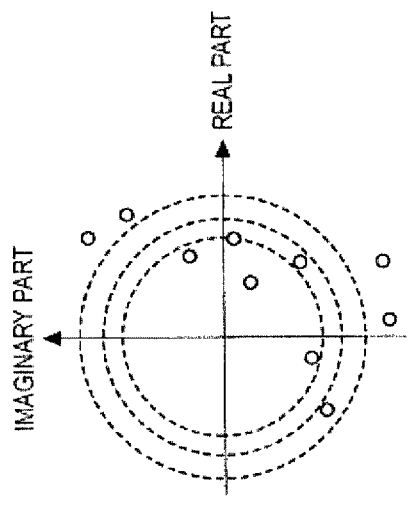

Therefore, as to each vector element of the array response vector, the magnitude (corresponding to the radius in the complex plane) is calculated. Supposing that they are within a predetermined range, for example, within the range of $\alpha-\epsilon \sim \alpha+\epsilon$, as shown in FIG. 3C, it is determined to be correct results. In the case that as shown in FIG. 3D, there are some elements outside the predetermined range, being affected by a characteristic difference in amplitude or phase with respect to an arrival angle of each sensor, there is a high possibility of incorrect results, and thus the results (that is, angle measurement results of the arriving signal wave by means of the ESPRIT angle measurement processing section 4) are excluded.

Next, in the case that due to influence from any characteristic difference in amplitude or phase with respect to an arrival angle at each sensor, large errors are superimposed on eigenvalues of a correlation matrix and an arriving signal wave number is erred, then the ESPRIT angle measurement processing is made in the condition different from the actual arriving signal wave number, and an electric power of the arriving signal wave to be obtained from processing results is not estimated properly.

As a result, for example, in the case that in spite of the condition of actually one arriving signal wave, it is erred to be in the condition of two arriving signal waves, the difference in electric power value between two estimated signal waves will be extremely large (e.g., several hundreds times).

Therefore, in the case that it is estimated that there are a plurality of arriving signal waves, power estimation results of respective arriving signal waves are compared. In the case of extremely small power estimation results, "being affected by a characteristic difference in amplitude or phase with respect to an arrival angle at each sensor, there is a high possibility of incorrect results", and thus angle measurement results of the arriving signal wave by means of the ESPRIT angle measurement processing section 4 are excluded.

Incidentally, it is preferable that all components of the ESPRIT angle measurement processing section 4, the array response vector estimation section 50 of an arriving signal wave, the power estimation section 51 of an arriving signal wave, and the reliability determination section 6 are formed into a dedicated logic circuit, or into a program in a general-purpose DSP or CPU. It is also preferable that a part of those components is formed into a dedicated circuit and the remaining parts are formed into a program in a general-purpose DSP or CPU.

As described above, a signal wave arrival angle measuring device according to this embodiment comprises:

a sensor group 2 converting a signal wave of an observation target to an electrical signal;

an observation data vector generation section 3 generating an observation data vector necessary for an angle measurement of the signal wave from the electrical signal converted at the sensor group 2;

an ESPRIT angle measurement processing section 4 calculating an arrival angle of the signal wave through an ESPRIT angle measurement processing from the observation data vector generated by the observation data vector generation section 3;

an arriving signal wave estimation section 5 estimating information other than the arrival angle of the arriving signal wave from an angle measurement processing process data of the ESPRIT angle measurement processing at the ESPRIT angle measurement processing section 4; and a reliability determination section 6 in which based on an estimation result of the arriving signal wave estimation section 5, it is determined whether or not an angle measurement result of the arrival angle calculated by the ESPRIT angle measurement processing section 4 is correct, to exclude an erroneous angle measurement result.

Consequently, according to the signal wave arrival angle measuring device of this embodiment, since in addition to arrival angle information of an arriving signal wave, another information (for example, information other than the arrival angle information) of the arriving signal wave is further estimated, and based on this another estimated information, it is determined whether or not angle measurement results calculated by the ESPRIT angle measurement processing section 4 are correct, erroneous angle measurement results can be excluded.

In addition, in the signal wave arrival angle measuring device according to this embodiment, the arriving signal wave estimation section 5 includes an array response vector estimation section 50 of the arriving signal wave for estimating an array response vector of the arriving signal from the process in which the ESPRIT angle measurement processing section 4 calculates the arrival angle of the signal wave; and the reliability determination section 6, based on an array response vector estimation result estimated by the array response vector estimation section 50, determines whether or not the angle measurement result is correct.

Further, in the signal wave arrival angle measuring device according to this embodiment, the arriving signal wave estimation section 5 includes a power estimation section 51 of the arriving signal wave of estimating an electric power of the arriving signal from the process in which the ESPRIT angle measurement processing section 4 calculates the arrival angle of the signal wave; and the reliability determination section 6, based on a power estimation result estimated by the power estimation section 51, determines whether or not the angle measurement result is correct.

Furthermore, in the signal wave arrival angle measuring device according to this embodiment, the arriving signal wave estimation section 5 includes an array response vector estimation section 50 of the arriving signal wave for estimating an array response vector of the arriving signal from the process in which the ESPRIT angle measurement processing section 4 calculates the arrival angle of the signal wave, and a power estimation section 51 of the arriving signal wave for estimating an electric power of the arriving signal from the process in which the ESPRIT angle measurement processing section 4 calculates the arrival angle of the signal wave; and the reliability determination section 6, based on an array response vector estimation result estimated by the array response vector estimation section 50 and on a power estimation result estimated by the power estimation section 51, determines whether or not the angle measurement result is correct.

That is, since in the reliability determination section 6, based on both array response vector estimation results estimated by the array response vector estimation section 50 and power estimation results estimated by the power estimation section 51, it is determined whether or not angle measurement results calculated by the ESPRIT angle measurement processing section 4 are correct, it can be determined with higher reliability whether or not angle measurement results calculated by the ESPRIT angle measurement processing section 4 are correct, and erroneous angle measurement results, if any, can be reliably excluded.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A signal wave arrival angle measuring device, comprising:

a sensor group converting a signal wave of an observation target to an electrical signal;

an observation data vector generation section generating an observation data vector necessary for an angle measurement of said signal wave from the electrical signal converted at said sensor group;

an ESPRIT angle measurement processing section calculating an arrival angle of said signal wave through an ESPRIT angle measurement processing from the observation data vector generated by said observation data vector section;

an arriving signal wave estimation section estimating information other than the arrival angle of said arriving signal wave from an angle measurement processing process data of the ESPRIT angle measurement processing at said ESPRIT angle measurement processing section; and a reliability determination section in which, based on an estimation result of said arriving signal wave estimation section, it is determined whether or not an angle measurement result of said arrival angle said ESPRIT angle measurement processing section calculates is correct, to exclude an erroneous angle measurement result, wherein said arriving signal wave estimation section includes an array response vector estimation section of the arriving signal wave for estimating an array response vector of the arriving signal from the process in which said ESPRIT angle measurement processing section calculates the arrival angle of said signal wave; and wherein said reliability determination section, based on an array response vector estimation result estimated by said array response vector estimation section, determines whether or not said angle measurement result is correct.

2. The signal wave arrival angle measuring device according to claim 1, wherein said arriving signal wave estimation section includes a power estimation section of the arriving signal wave for estimating an electric power of the arriving signal from the process in which said ESPRIT angle measurement processing section calculates the arrival angle of said signal wave; and wherein said reliability determination section, based on a power estimation result estimated by said power estimation section, determines whether or not said angle measurement result is correct.

3. A signal wave arrival angle measuring device, comprising:

a sensor group converting a signal wave of an observation target to an electrical signal;

an observation data vector generation section generating an observation data vector necessary for an angle measurement of said signal wave from the electrical signal converted at said sensor group;

an ESPRIT angle measurement processing section calculating an arrival angle of said signal wave through an ESPRIT angle measurement processing from the observation data vector generated by said observation data vector section;

an arriving signal wave estimation section estimating information other than the arrival angle of said arriving signal wave from an angle measurement processing process data of the ESPRIT angle measurement processing at said ESPRIT angle measurement processing section; and a reliability determination section in which, based on an estimation result of said arriving signal wave estimation section, it is determined whether or not an angle measurement result of said arrival angle said ESPRIT angle measurement processing section calculates is correct, to exclude an erroneous angle measurement result, wherein said arriving signal wave estimation section includes an array response vector estimation section of the arriving signal wave for estimating an array response vector of the arriving signal from the process in which said ESPRIT angle measurement processing section calculates the arrival angle of said signal wave, and a power estimation section of the arriving signal wave of estimating an electric power of the arriving signal from the process in which said ESPRIT angle measurement processing section calculates the arrival angle of said signal wave; and wherein said reliability determination section, from an array response vector estimation result estimated by said array response vector estimation section and based on a power estimation result estimated by said power estimation section, determines whether or not said angle measurement result is correct.

\* \* \* \* \*